United States Patent
Choi (10) Patent No.: US 12,148,944 B2
(45) Date of Patent: Nov. 19, 2024

(54) BATTERY INSTALLATION STRUCTURE FOR VEHICLE

(71) Applicants: Hyundai Motor Company, Seoul (KR); Kia Corporation, Seoul (KR)

(72) Inventor: Yong Hwan Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 487 days.

(21) Appl. No.: 17/521,929

(22) Filed: Nov. 9, 2021

(65) Prior Publication Data

US 2022/0069405 A1 Mar. 3, 2022

Related U.S. Application Data

(63) Continuation-in-part of application No. 17/028,911, filed on Sep. 22, 2020, now Pat. No. 11,912,120.

(30) Foreign Application Priority Data

| Apr. 27, 2020 | (KR) | 10-2020-0050812 |
| Mar. 8, 2021 | (KR) | 10-2021-0030369 |

(51) Int. Cl.
*H01M 50/249* (2021.01)
*H01M 50/207* (2021.01)
(Continued)

(52) U.S. Cl.
CPC ....... *H01M 50/249* (2021.01); *H01M 50/207* (2021.01); *H01M 50/242* (2021.01);
(Continued)

(58) Field of Classification Search
CPC . B60K 1/04; B60K 2001/0438; B60L 3/0007; B60L 50/64; H01M 2220/20;
(Continued)

(56) References Cited

U.S. PATENT DOCUMENTS

| 2018/0029493 A1* | 2/2018 | Kobayashi | ............... B60K 1/00 |
| 2018/0109328 A1 | 4/2018 | Eberhard et al. | |

(Continued)

FOREIGN PATENT DOCUMENTS

| KR | 10-2014-0045778 A | 4/2014 |
| KR | 10-2154361 | 9/2020 |

OTHER PUBLICATIONS

Non-Final Office Action issued Jul. 8, 2022 in U.S. Appl. No. 17/028,911.

(Continued)

*Primary Examiner* — Victoria H Lynch
(74) *Attorney, Agent, or Firm* — Fox Rothschild LLP (57) ABSTRACT

A battery installation structure for a vehicle includes a case, configured to allow a plurality of battery modules to be mounted in the case, and a pack end plate mounted so as to form a shock-absorbing space between a wall surface of the case and one end of each of the plurality of battery modules that is parallel to and faces the wall surface, among two opposite ends of each of the plurality of battery modules in a stacking direction of battery cells, the shock-absorbing space including a slanted surface slanted with respect to the wall surface.

7 Claims, 11 Drawing Sheets

(51) Int. Cl.
  *H01M 50/242*    (2021.01)
  *B60K 1/04*      (2019.01)
  *B60L 50/64*     (2019.01)

(52) U.S. Cl.
  CPC ............... *B60K 1/04* (2013.01); *B60L 50/64* (2019.02); *H01M 2220/20* (2013.01)

(58) Field of Classification Search
  CPC ............ H01M 50/207; H01M 50/242; H01M 50/249; Y02E 60/10; Y02T 10/70
  See application file for complete search history.

(56) References Cited

U.S. PATENT DOCUMENTS

| | | |
|---|---|---|
| 2020/0127344 A1* | 4/2020 | Lim ................. H01M 10/6557 |
| 2020/0207221 A1 | 7/2020 | Matecki et al. |
| 2020/0287179 A1 | 9/2020 | Wang et al. |
| 2020/0343498 A1 | 10/2020 | Schuessler et al. |
| 2021/0221436 A1 | 7/2021 | Tsuyuzaki et al. |
| 2021/0402863 A1 | 12/2021 | Huang et al. |

OTHER PUBLICATIONS

Non-Final Office Action issued Apr. 25, 2024 in U.S. Appl. No. 17/521,923.

* cited by examiner

BATTERY INSTALLATION STRUCTURE FOR VEHICLE

CROSS-REFERENCE TO THE RELATED APPLICATION

This application is a continuation-in-part of U.S. Ser. No. 17/028,911 filed on Sep. 22, 2020, which claims under 35 U.S.C. § 119(a) the benefit of Korean Patent Application No. 10-2020-0050812 filed on Apr. 27, 2020 in the Korean Intellectual Property Office, and also claims under 35 U.S.C. § 119(a) the benefit of Korean Patent Application No. 10-2021-0030369 filed on Mar. 8, 2021 in the Korean Intellectual Property Office, the entire contents of which are incorporated herein by reference.

BACKGROUND

1. Technical Field

The present disclosure relates to a structure for installing a battery in a hybrid vehicle or an electric vehicle.

2. Description of the Related Art

The demand for eco-friendly vehicles, such as hybrid vehicles or electric vehicles, has recently increased. The increasing demand for eco-friendly vehicles has mandated an increase in the energy capacity of batteries installed in vehicles.

Therefore, there is the need for technology for enabling installation of a battery having as large an energy capacity as possible in a limited space while securing sufficient durability and safety.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

It is an object of the present disclosure to provide a battery installation structure for a vehicle, which is lightweight due to simplification of the configuration thereof, appropriately supports and disperses an expansion load generated by swelling of a cell of a battery module installed in the vehicle, and minimizes direct transfer of impacts to the battery module in the event of a vehicle collision, thereby securing sufficient safety and durability so as to withstand impacts due to a vehicle collision or the like.

In accordance with the present disclosure, the above and other objects can be accomplished by the provision of a battery installation structure for a vehicle, including a case, configured to allow a plurality of battery modules to be mounted therein, and a pack end plate mounted so as to form a shock-absorbing space between a wall surface of the case and one end of each of the plurality of battery modules that is parallel to and faces the wall surface, among the two opposite ends of each of the plurality of battery modules in a stacking direction of battery cells, the shock-absorbing space including a slanted surface slanted with respect to the wall surface.

The pack end plate may be formed in a closed cross-sectional structure including a vertical support surface formed so as to be in contact with each of the plurality of battery modules and a slanted support surface connected to the vertical support surface so as to form the slanted surface of the shock-absorbing space.

The pack end plate may include a bottom support surface connected to the vertical support surface and the slanted support surface. The bottom support surface may be fixed to the upper portion of an inner protruding portion, which protrudes from the wall surface of the case toward each of the plurality of battery modules.

The pack end plate may be fixed to the inner protruding portion in the state of being spaced apart from the wall surface of the case, and the vertical support surface of the pack end plate may protrude further toward each of the plurality of battery modules than an end of the inner protruding portion.

The inner protruding portion of the case may protrude toward the lower portion of each of the plurality of battery modules, and the height of the pack end plate mounted to the upper portion of the inner protruding portion may be set to ⅔ or more of the height of each of the plurality of battery modules.

The slanted support surface of the pack end plate may be formed such that the angle formed between the slanted support surface and the wall surface of the case is 9° or more.

The case may be configured such that first inner members are disposed parallel to each other while being spaced apart from each other on a lower panel, second inner members are disposed perpendicular to the first inner members, and the plurality of battery modules is accommodated in the case using the first inner members and the second inner members. The plurality of battery modules may be disposed such that the stacking direction of the battery cells is parallel to the longitudinal direction of the first inner members.

The outer periphery of the case may include straight side portions, formed straight on both sides of the case so as to be parallel to the second inner members, each of the straight side portions forming the wall surface so that the pack end plate is mounted between the wall surface and a corresponding one of the plurality of battery modules, and bent portions connecting the ends of the straight side portions, at least a portion of each of the bent portions being bent.

An outer side member may be provided at the outer surface of each of the straight side portions of the case so as to protrude outwards.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited only to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present disclosure will be described with reference to the accompanying drawings. In the drawings, the same reference numerals refer to the same components.

Referring to FIGS. 1 to 4, a battery installation structure for a vehicle according to the present disclosure includes a case 9, which is configured such that first inner members 3 are disposed parallel to each other while being spaced apart from each other on a lower panel 1, such that second inner members 5 are disposed perpendicular to the first inner members 3, and such that a plurality of battery modules 7 is accommodated in the case 9 using the first inner members 3 and the second inner members 5, and an outer side member 11, which is provided at the outer periphery of the case 9 so as to protrude outwards.

Figure 1:
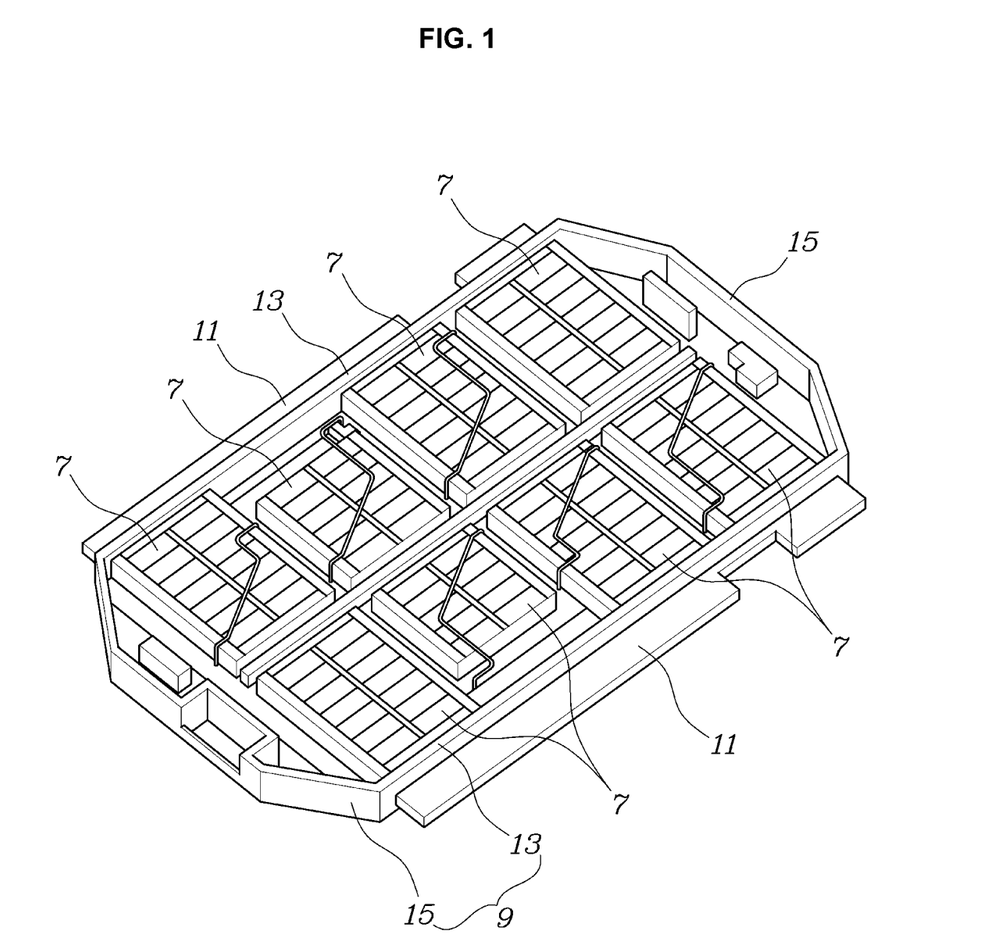
FIG. 1 is a view illustrating a battery installation structure for a vehicle according to the present disclosure.

FIG. 1 is a view showing the state in which the battery modules 1 are completely mounted in the case 9 when viewed from above. A cover (not shown) may be coupled to the upper part of the case 9 shown in FIG. 1 before the case 9 is installed in the vehicle.

Figure 2:
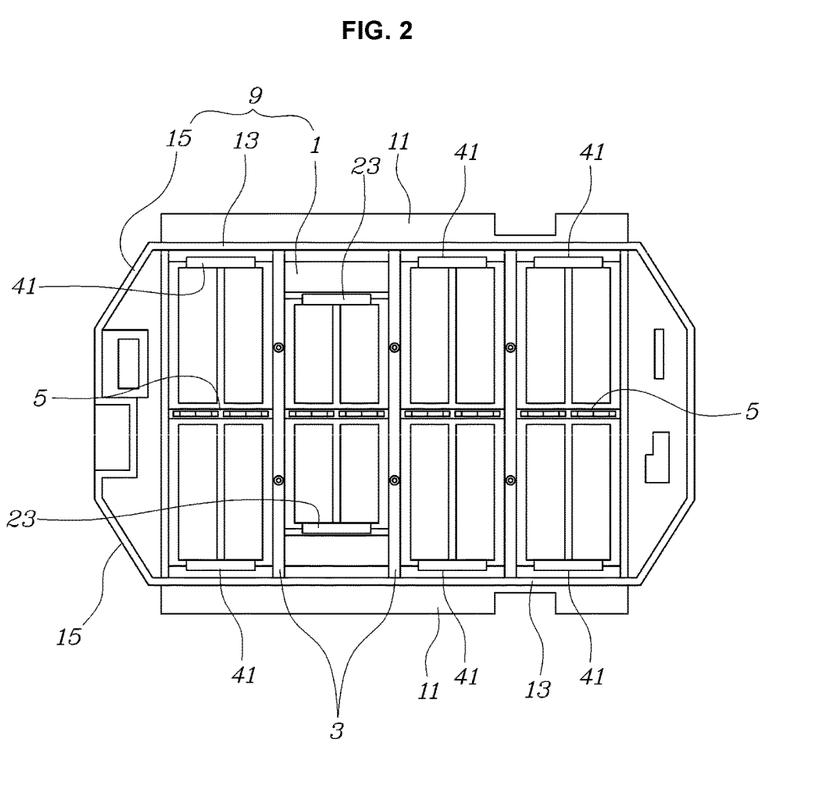
FIG. 2 is a view showing the case shown in FIG. 1.

The outer periphery of the case 9 may be composed of straight side portions 13, which are formed straight on both sides of the case 9 so as to be parallel to the second inner members 5, and bent portions 15, which connect the ends of the straight side portions 13 and at least a portion of each of which is bent. The lower panel 1 is mounted so as to block the lower sides of the straight side portions 13 and the bent portions 15, whereby the battery modules 7 are mounted in the space defined by the straight side portions 13, the bent portions 15, and the lower panel 1. The cover may be coupled to the case 9 so as to cover the battery modules, and then the assembly of the cover and the case may be installed in the vehicle.

The outer side member 11 is formed so as to protrude from the outer surface of each of the straight side portions 13 toward the outside of the case 9.

Thus, when an impact is transferred to the outer side member 11 of the case 9 in the event of a vehicle collision or the like, the first inner members 3 in the case 9 disperse the impact, thereby more securely and safely supporting and protecting the battery modules 7 mounted in the case 9.

Figure 4:
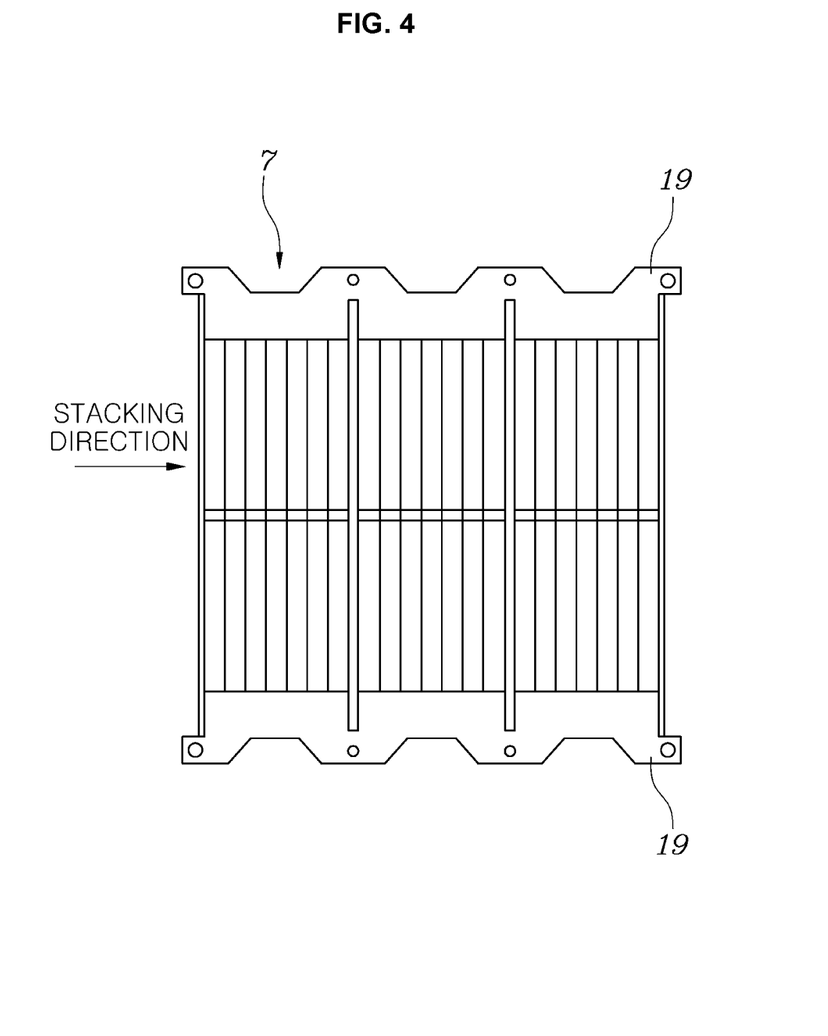
FIG. 4 is a plan view showing the battery module shown in FIG. 3 when viewed from above.

As shown in FIG. 4, each of the battery modules 7 is configured such that multiple battery cells 17 are stacked in one direction.

Figure 3:
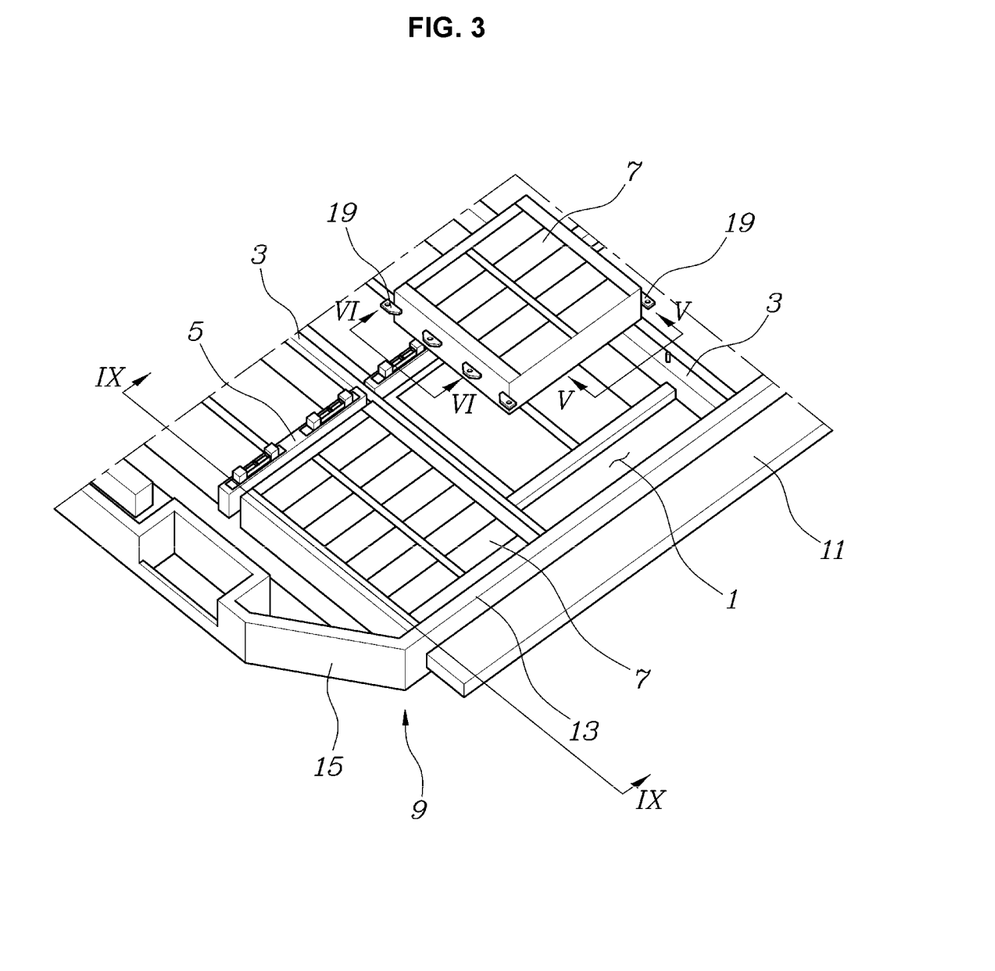
FIG. 3 is a view illustrating the process of mounting a battery module in the case.

Referring to FIG. 3, the direction in which the battery cells 17 are stacked in the battery module 7 is parallel to the longitudinal direction of the first inner members 3.

The two opposite ends of the battery module 7 in a direction perpendicular to the stacking direction of the battery cells 17 are fixed to the first inner members 3.

Figure 5:
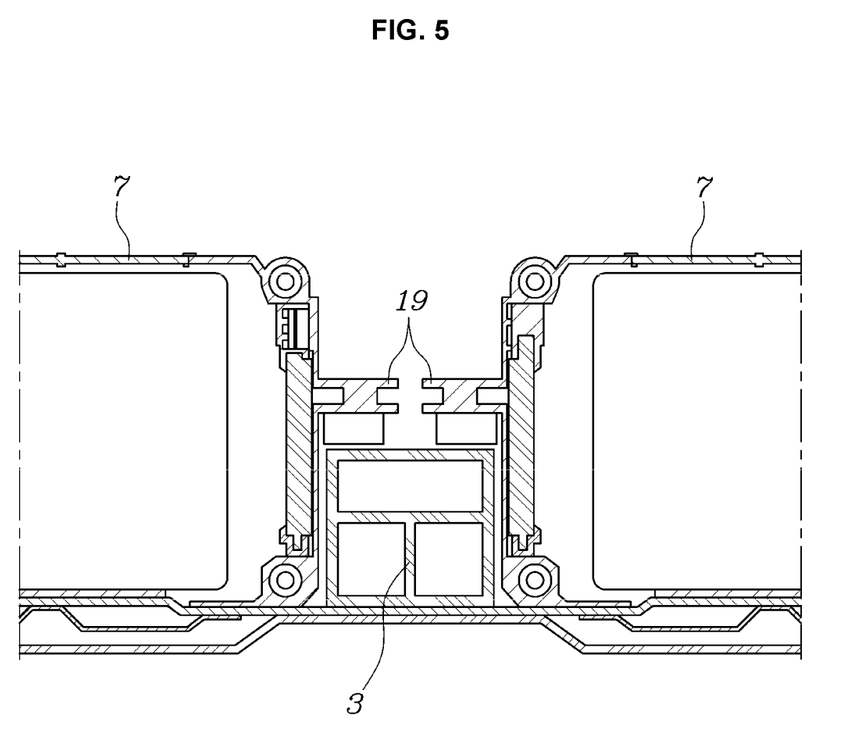
FIG. 5 is a cross-sectional view taken along line V-V in FIG. 3, which shows the state in which the battery module is disposed in the case.

As illustrated in FIG. 5, each of the first inner members 3 is formed as a beam having a rectangular-shaped cross-section, in which a plurality of closed spaces is formed. Fixing flanges 19, which are formed at the two opposite ends of each of the battery modules 7, are fixed to the upper surfaces of the first inner members 3.

For example, a fixing bolt may be provided at the upper surface of the first inner member 3 so as to protrude therefrom and to be fitted into the fixing flange 19 of the battery module 7, and a nut may be engaged with the fixing bolt so that the fixing flange 19 is fixed to the upper surface of the first inner member 3. Alternatively, a fixing bolt may be provided so as to penetrate the fixing flange 19 and then to be fastened to the first inner member 3. Alternatively, the above coupling structures may be combined in order to fix the battery module 7 to the first inner member 3.

Further, at least one of the two opposite ends of the battery module 7 in the stacking direction of the battery cells 17 is supported by the second inner members 5.

Figure 6:
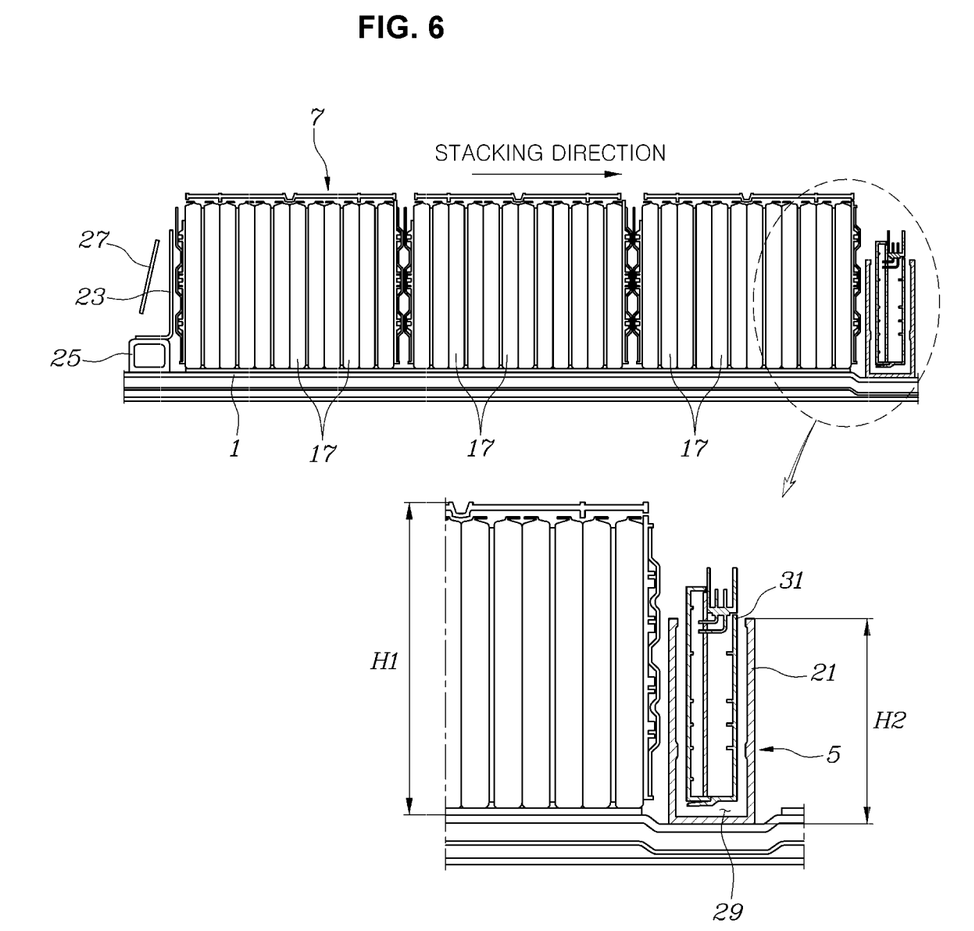
FIG. 6 is a cross-sectional view taken along line VI-VI in FIG. 3, which shows the state in which the battery module is disposed in the case.
Figure 7:
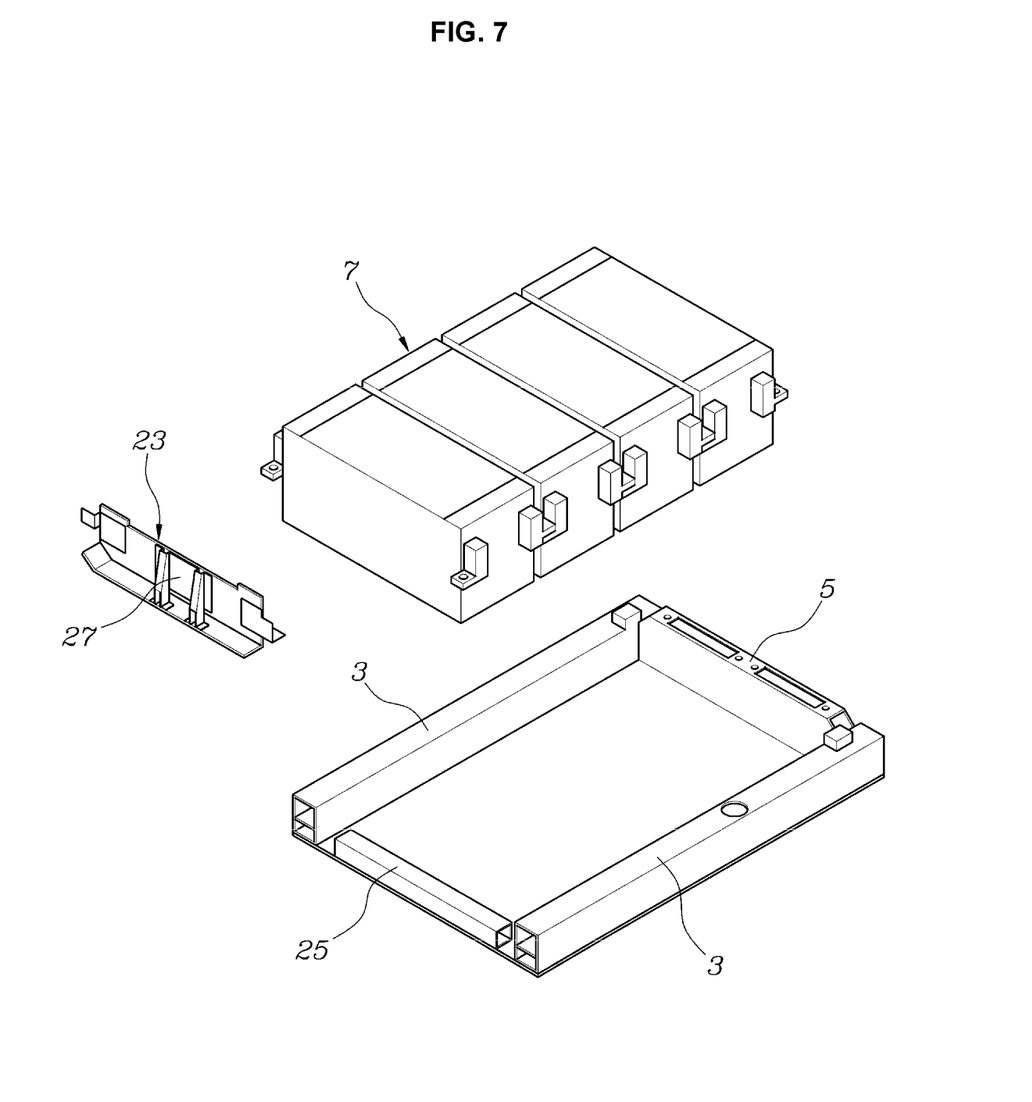
FIG. 7 is an enlarged perspective view of the portion indicated by line VI-VI in FIG. 3, which shows a battery module mounting structure.
Figure 8:
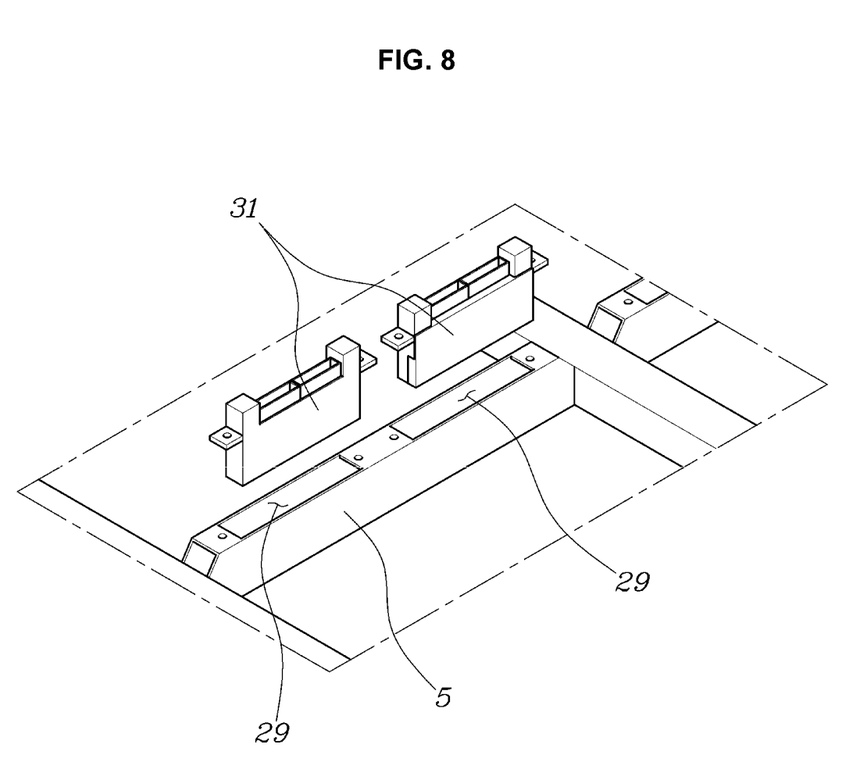
FIG. 8 is a view showing the structure in which a battery controller is mounted in an insertion space in a second inner member.

Referring to FIGS. 6 to 8, the second inner member 5 includes a side wall 21 that faces the battery cells 17, and the side wall 21 is formed perpendicular to the lower panel 1 of the case 9 so as to support the battery module 7 horizontally.

In order to allow the side wall 21 of the second inner member 5 to stably support the battery module 7, it is preferable that the height H2 that the side wall 21 protrudes upwards from the lower panel 1 be set to ⅔ or more of the height H1 of the battery module 7.

The second inner member 5 may be configured such that two side walls 21 are provided and an insertion space 29 is formed between the two side walls 21 so as to allow another component to be inserted into the insertion space 29.

As illustrated in FIG. 8, a battery controller 31 may be inserted into the insertion space 29 in the second inner member 5, a connector of the battery controller 31 may be disposed so as to be oriented in the upward direction of the second inner member 5, and the battery controller 31 may be fixed to the upper surface of the second inner member 5 using a bolt.

Therefore, the connectors for electrically connecting or disconnecting the battery controller 31 to or from an external device may be engaged or separated very easily. Further, since the battery controller 31 is inserted into the second inner member 5, a separate space for mounting the battery controller, which is required in the related art, may be used for other purposes, for example, may be used as a space for mounting additional battery cells 17, or may be used to increase the amount of indoor space in the vehicle body.

Figure 9:
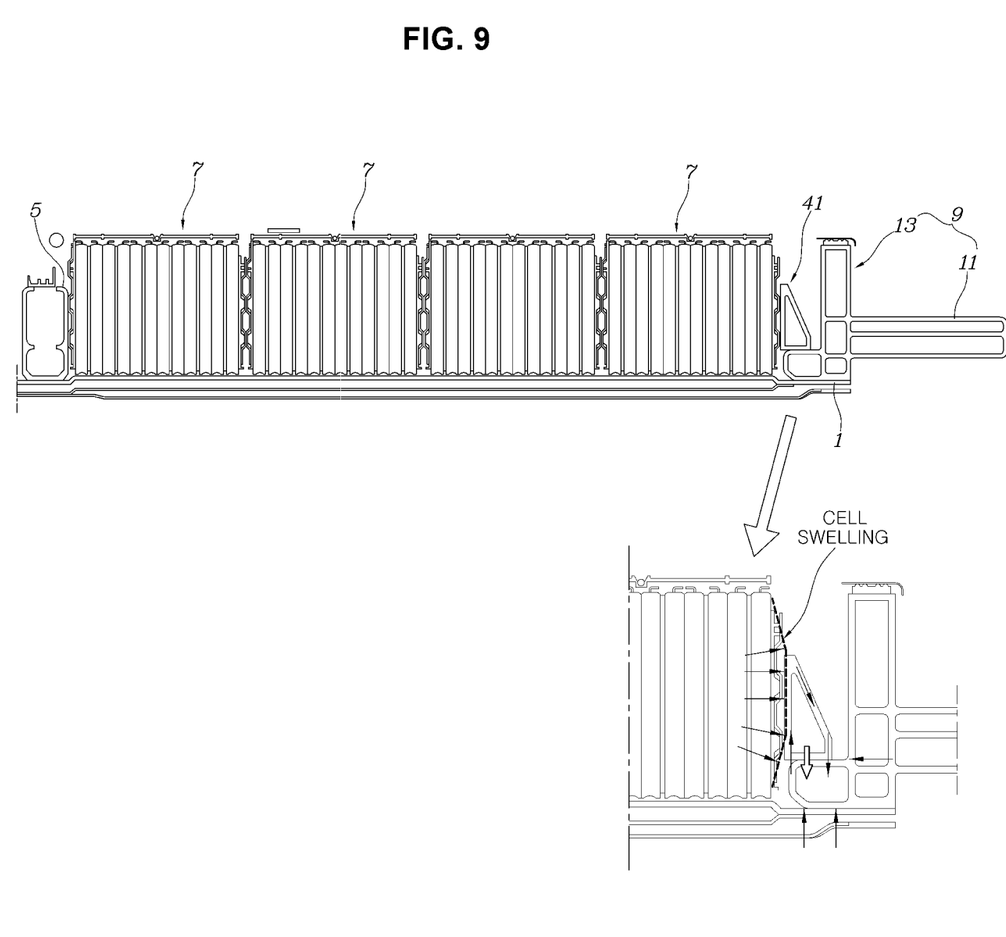
FIG. 9 is a cross-sectional view taken along line IX-IX in FIG. 3, which shows the state in which the battery installation structure for the vehicle according to the present disclosure supports the battery module by dispersing a load generated by swelling of a cell of the battery module.
Figure 10:
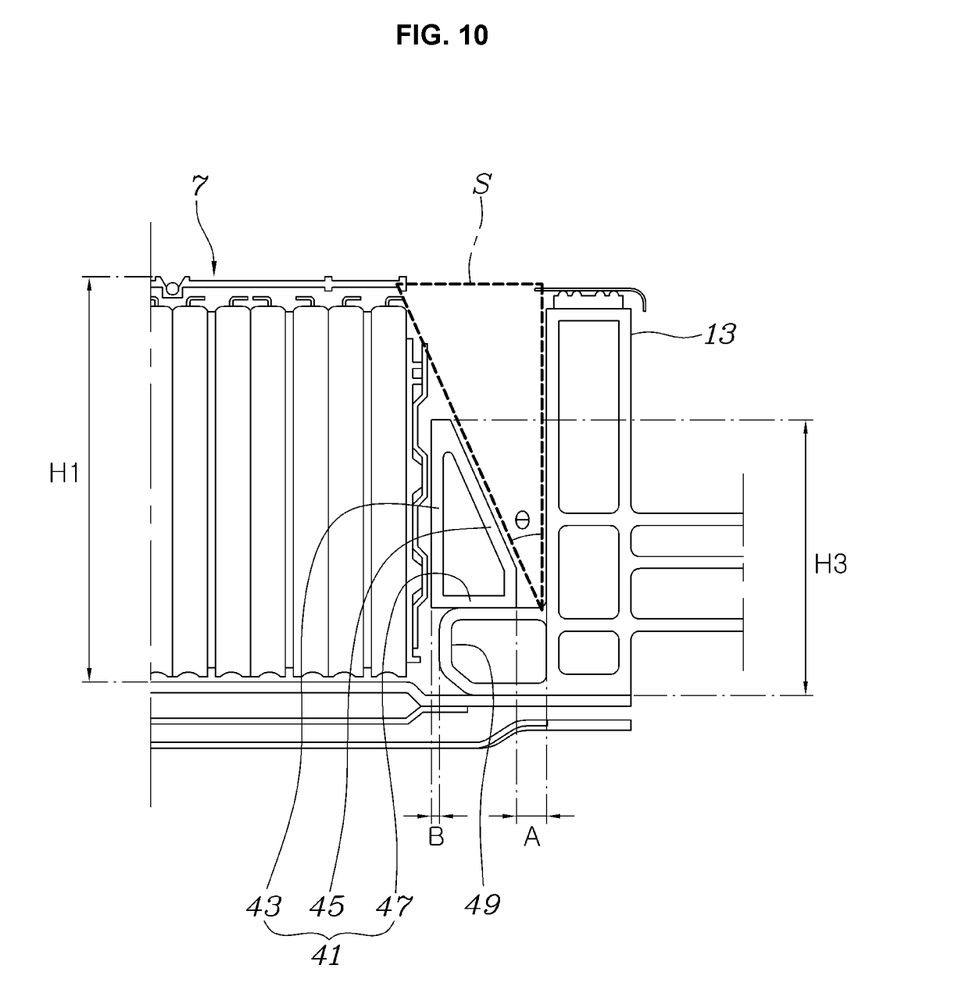
FIG. 10 is an enlarged view of main parts of the configuration shown in FIG. 9.
Figure 11:
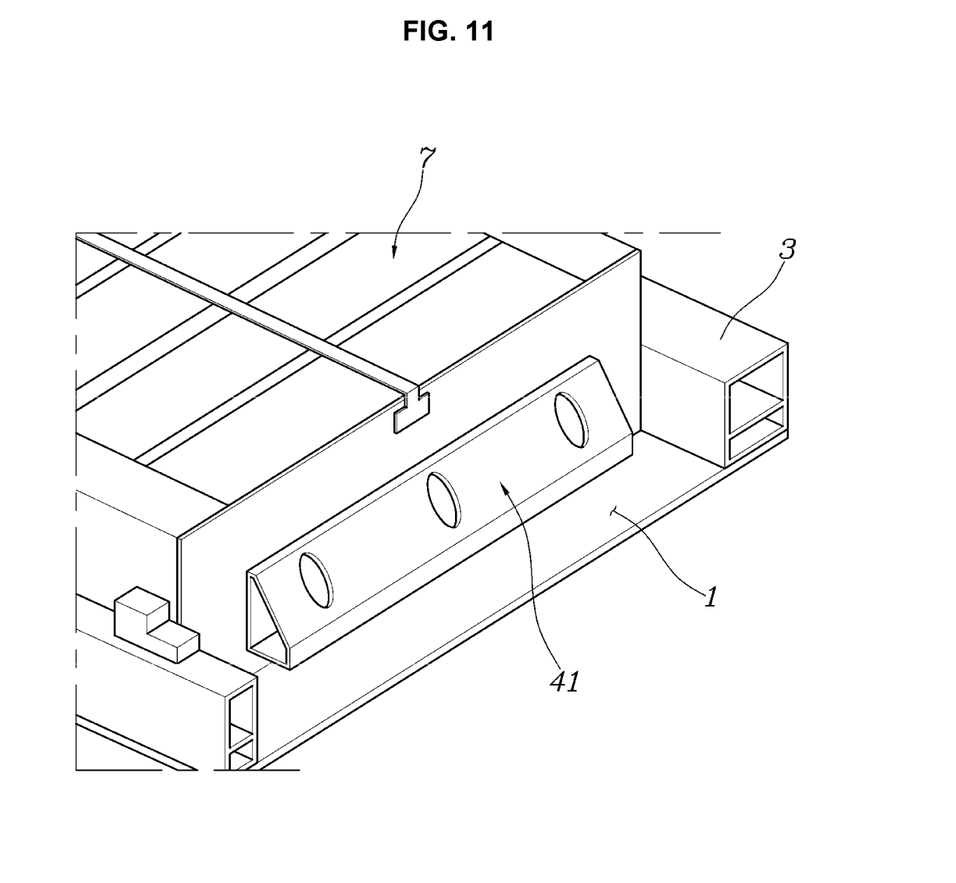
FIG. 11 is a perspective view showing the pack end plate shown in FIG. 10.

One end of each of the battery modules 7 mounted in the case 9 is supported by the second inner member 5, and the remaining end thereof is supported by a pack end plate 41 in the state of being parallel to and facing the wall surface formed by the straight side portion 13 of the case 9, as shown in FIGS. 9 to 11.

The pack end plate 41 is mounted so as to form a shock-absorbing space S between the wall surface formed by the straight side portion 13 and the battery module 7, and the shock-absorbing space S includes a slanted surface, which is slanted with respect to the wall surface.

Therefore, even when the case 9 is deformed in the event of a side collision of the vehicle or the like, the shock-absorbing space S minimizes direct transfer of impacts from the case 9 to the battery module 7, thereby enabling more reliable protection of the battery module 7.

The pack end plate 41 may be formed in a closed cross-sectional structure that includes a vertical support surface 43, which is in contact with the battery module 7, and a slanted support surface 45, which is connected to the vertical support surface 43 so as to form the slanted surface of the shock-absorbing space S.

In addition, the pack end plate 41 includes a bottom support surface 47, which is connected to the vertical support surface 43 and the slanted support surface 45. The bottom support surface 47 is fixed to the upper portion of an inner protruding portion 49, which protrudes from the wall surface of the case 9 toward the battery module 7.

Therefore, as illustrated in FIG. 9, the vertical support surface 43 of the pack end plate 41 receives an expansion load generated by swelling of a cell of the battery module 7, and disperses and transfers the expansion load to the case 9 via the inner protruding portion 49, thereby reliably supporting the battery module 7.

For reference, the arrows shown in FIG. 9 indicate the expansion load generated by swelling of a cell of the battery module, the transfer of the load, and the support force generated in the case 9 in order to withstand the load.

According to the present embodiment, as shown in detail in FIG. 10, the pack end plate 41 is fixed to the inner protruding portion 49 in the state of being spaced apart from the wall surface of the case 9 by a predetermined gap A, and the vertical support surface 43 of the pack end plate 41 protrudes further toward the battery module 7 than an end of the inner protruding portion 49 by a predetermined distance B.

Accordingly, it is possible to minimize direct contact of the case 9 with the battery module 7 while allowing an expansion load generated by swelling of a cell of the battery module 7 to be transferred to the case 9 via the pack end plate 41. As a result, even when the case 9 is deformed in the event of a side collision of the vehicle or the like, the direct transfer of impacts to the battery module 7 from the case 9 is minimized, thereby enabling more reliable protection of the battery module 7.

The inner protruding portion 49 of the case 9 protrudes toward the lower portion of the battery module 7. It is preferable that the height H3 of the pack end plate 41, which is mounted to the upper portion of the inner protruding portion 49, be set to ⅔ or more of the height H1 of the battery module 7.

As described above, since the height H3 from the lower end of the battery module 7 to the upper end of the pack end plate 41, which is mounted to the upper portion of the inner protruding portion 49, is ⅔ or more of the overall height H1 of the battery module 7, in the event of swelling of a cell of the battery module 7, the vertical support surface 43 of the pack end plate 41 is capable of stably supporting and holding the battery module 7 by applying surface pressure to the battery module 7 using a sufficiently large flat surface thereof.

Of course, the height H3 to the upper end of the pack end plate 41 is set so as not to exceed the height H1 of the battery module 7.

The slanted support surface 45 of the pack end plate 41 is preferably formed such that the angle θ formed between the slanted support surface 45 and the wall surface formed by the straight side portion 13 of the case 9 is 9° or more, whereby it is possible to secure sufficient shock-absorbing space S. Accordingly, even when the upper portion of the straight side portion 13 is deformed toward the battery module 7 in the event of a side collision of the vehicle or the like, it is possible to prevent direct contact with the battery module 7.

The angle θ formed between the slanted support surface 45 and the wall surface formed by the straight side portion 13 of the case 9 may be preferably set to 45° or less. Even in the extreme case, it is preferable for the angle θ not to exceed 70°.

When the remaining end of the battery module 7, which is not supported by the second inner member 5, is not supported by the pack end plate 41 or the straight side portion 13 of the case 9, the remaining end of the battery module 7 may be supported by an independent end plate, as shown in the drawing on the left in FIG. 6 and shown in FIG. 7.

The independent end plate 23 is a component that is provided separately from the battery module 7. As shown in the drawings, an auxiliary support bar 25 may be fixed to the upper portion of the lower panel 1, and the independent end plate 23 may be fixed to the upper portion of the auxiliary support bar 25 so as to support the battery module 7. Alternatively, the auxiliary support bar 25 may be omitted, and the independent end plate 23 may be directly fixed to the lower panel 1.

The independent end plate 23 is integrally provided with a slanted bracket 27, which has a cross-section that is slanted with respect to the surface of the battery cell 17 so as to form a support force for supporting the surface of the battery cell 17, thereby securely supporting the battery module 7.

As is apparent from the above description, the battery installation structure for the vehicle according to the present disclosure is lightweight due to simplification of the configuration thereof, appropriately supports and disperses an expansion load generated by swelling of a cell of a battery module installed in a vehicle, and minimizes direct transfer of impacts to the battery module in the event of a vehicle collision, thereby securing sufficient safety and durability so as to withstand impacts due to a vehicle collision or the like.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A battery installation structure for a vehicle, comprising:
   a case configured to allow a plurality of battery modules to be mounted in the case; and
   a pack end plate mounted so as to form a shock-absorbing space between a wall surface of the case and one end of each of the plurality of battery modules that is parallel to and faces the wall surface, among opposite ends of each of the plurality of battery modules in a stacking direction of battery cells, the shock-absorbing space including a slanted surface slanted with respect to the wall surface;
   wherein the pack end plate is formed in a closed cross-sectional structure comprising a vertical support surface formed so as to be in contact with each of the plurality of battery modules and a slanted support surface connected to the vertical support surface so as to form the slanted surface of the shock-absorbing space;
   wherein the pack end plate comprises a bottom support surface connected to the vertical support surface and the slanted support surface; and
   wherein the bottom support surface is fixed to an upper portion of an inner protruding portion, the inner protruding portion protruding from the wall surface of the case toward each of the plurality of battery modules.

2. The battery installation structure of claim 1, wherein the pack end plate is fixed to the inner protruding portion in a state of being spaced apart from the wall surface of the case, and
   wherein the vertical support surface of the pack end plate protrudes further toward each of the plurality of battery modules than an end of the inner protruding portion.

3. The battery installation structure of claim 1, wherein the inner protruding portion of the case protrudes toward a lower portion of each of the plurality of battery modules, and
   wherein a height of the pack end plate mounted to an upper portion of the inner protruding portion is set to ⅔ or more of a height of each of the plurality of battery modules.

4. The battery installation structure of claim 3, wherein the slanted support surface of the pack end plate is formed such that an angle formed between the slanted support surface and the wall surface of the case is 9° or more.

5. The battery installation structure of claim 1, wherein the case is configured such that first inner members are disposed parallel to each other while being spaced apart from each other on a lower panel, second inner members are disposed perpendicular to the first inner members, and the plurality of battery modules is accommodated in the case using the first inner members and the second inner members, and
   wherein the plurality of battery modules is disposed such that the stacking direction of the battery cells is parallel to a longitudinal direction of the first inner members.

6. The battery installation structure of claim 5, wherein an outer periphery of the case comprises straight side portions, formed straight on both sides of the case so as to be parallel to the second inner members, each of the straight side portions forming the wall surface so that the pack end plate is mounted between the wall surface and a corresponding one of the plurality of battery modules, and bent portions connecting ends of the straight side portions, at least a portion of each of the bent portions being bent.

7. The battery installation structure of claim 6, wherein an outer side member is provided at an outer surface of each of the straight side portions of the case so as to protrude outwards.

* * * * *